United States Patent Office 3,003,847
Patented Oct. 10, 1961

3,003,847
PROCESS OF RECOVERING URANIUM VALUES
Howard M. Dess, Grand Island, N.Y., assignor to Union Carbide Corporation, a corporation of New York
No Drawing. Filed Apr. 19, 1956, Ser. No. 579,134
2 Claims. (Cl. 23—14.5)

This invention relates to a process of recovering uranium values from certain uranium containing alloys or metallic mixtures thereof.

Various methods are known for isolating uranium from admixtures with other metals. However, special problems arise when the starting materials, such as spent atomic reactor fuel slugs, are radioactive. Again, a suitable method of isolating uranium from one type of uranium alloy or metallic mixture may not be satisfactory for another uranium admixture. For example, one standard method that is employed in recovering uranium from a spent aluminum-clad reactor slug, involves in part the complete dissolution of the slug in dilute aqueous nitric acid. The uranium value is thereafter isolated by organic solvent extraction methods from the other metallic component slug values and eventually recovered from the organic solvent phase. A serious disadvantage of the process, however, particularly when working with highly radioactive materials, is that radiation-induced decomposition of the aqueous and the organic solvents may result. Moreover, if it were desired to work with higher concentrations of solution, in order for example to reduce disposal problems of highly radioactive waste materials, a corresponding increase in decomposition of solvent would have to be expected. A further limitation of the dissolution method is that it is dependent upon the solubility characteristics of the various metallic components of the uranium-containing metallic materials. It is generally known for example, that zirconium metal is very desirable as a container for fissionable materials, but zirconium is also relatively insoluble in dilute nitric acid.

An object of the present invention therefore is to provide a method wherein a separation of uranium values can be effected from a variety of uranium containing alloys or metallic mixtures thereof without the limitations of the dissolution method.

Another object of the present invention is to provide a method of recovering uranium values from radioactive alloys or metallic mixture thereof containing uranium.

A further object of the present invention is to provide a method of recovering radioactive waste materials in a highly concentrated form suitable for storage or disposal.

In accordance with the present invention, a process is provided for recovering uranium values from uranium-containing, metallic, solid hydride-forming materials, comprising contacting with an alkali metal acid fluoride at an elevated temperature, a uranium-containing, metalliferous solid hydride material, treating the resulting metal-hydride, alkali-metal acid-fluoride reaction mixture with hydrogen fluoride, at a temperature in the range of 60° C. to 250° C., thereafter reacting the resulting reaction mixture with elemental fluoride at a temperature ranging up to about 700° C., and recovering the uranium values in the form of a volatile hexafluoride so produced.

A principal feature of the present invention resides in the recognition and employment of the fact that although uranium forms both a stable tetra and hexa fluoride as a quadravalent fluoride it is a high melting salt, while as a hexafluoride it is a volatile compound. Direct fluorination of a uranium-containing, solid hydride-forming material is not practicable, since a fluoride film initially formed at an exposed metallic interface substantially impedes further reaction. However, when a hydriding step is performed, in accordance with the invention, either prior to or concurrently with the fluorinating step, the pore structure of the metal is substantially modified by the penetration of the hydrogen and the inner recesses of the massive metal surface are made readily accessible to direct attack by elemental fluorine or hydrogen fluoride.

In the practice of one form of the invention, a uranium-containing, metalliferous solid hydride material is reacted with an alkali metal acid fluoride at elevated temperatures. A mole ratio of metal to alkali acid fluoride of 1 to 4 is preferred, although it has been found that satisfactory results have been obtained in using metal to acid-fluoride mixtures in ratio varying over a range of from 1:4 to 1:12. It is desirable, however, that the uranium-containing, metallic, solid hydride-forming material be initially hydrided at an elevated temperature in the range of between 150° C. and 250° C. and thereafter reacted with the alkali metal acid fluoride.

The resulting alkali acid fluoride and metal hydride mixture, in either case, is then treated with hydrogen fluoride gas in excess of stoichiometric demands at a temperature in the range of 60° C. to 250° C. Experience has demonstrated that a temperature in the range of 60° C. to 150° C. is preferable. At the conclusion of the hydrofluorination treatment, wherein the uranium-containing, metallic, solid hydride-forming material has been substantially transformed chemically into metallic fluorides, the temperature of the reaction may be elevated up to as high as 700° C. to remove any volatile reaction products such as lower boiling metallic fluorides. The reaction may be interrupted at this point if desired, by letting the reaction mixture solidify and dispelling any residual gaseous products with an inert gas such as hydrogen or argon.

The as-formed solidified reaction mixture is now exceedingly amenable to treatment with elemental fluorine, whereby uranium values can be selectively separated from other solid metal fluorides in the form of a volatile hexafluoride. The uranium-free residue, if radioactive, may thereafter be conveniently stored or disposed of, if desired, in a highly concentrated solidified form. It is essential that during the final fluorination step, the reaction mixture should be maintained in the liquid phase for the most efficient results. This is conveniently accomplished by passing a mixture of fluorine and hydrogen fluoride through the reaction mixture prior to the final fluorination treatment. Low melting alkali metal polyacid fluorides result which may be readily maintained in the liquid phase.

Before the final fluorination treatment the inert gas atmosphere over the solidified metallic fluoride reaction mixture such as hydrogen or argon gas is displaced with additional hydrogen fluoride gas and the temperature is raised to transform the low melting solidified reaction mixture to the liquid phase. Elemental fluorine is then passed into the reaction mixture at a temperature ranging up to 700° C. Thereafter, uranium hexafluoride is continually recovered as formed from the melt with the other gaseous reaction products, and may be selectively condensed in a separate container.

Appropriate alkali metal acid fluorides that are suitable in the practice of the present invention are potassium acid fluoride, lithium acid fluoride and sodium acid fluoride.

As employed herein the term "uranium-containing, metallic, solid hydride-forming" materials designates solid hydride-forming uranium-containing, metallic mixtures, uranium-containing, metallic alloys, uranium-containing, metallic alloys admixed with other metals or metallic alloys. Representative of the solid hydride-forming metals that are included within the scope of this invention are alkali metals, alkaline earth metals, and metals of the transitional elements including the "rare earth" metals, more particularly, cesium, lithium, potassium, sodium, rubidium, barium, calcium, strontium, lanthanum, cerium, praeseodymium, neodymium, scandium, yttrium, actinium, thorium, uranium, plutonium, titanium, zirconium, hafnium, vanadium, niobium, tantalum, chromium and molybdenum.

The process of the invention may be practiced by contacting a uranium-containing, metallic, solid hydride-forming material with hydrogen and an alkali metal acid fluoride at an elevated temperature whereby the metallic constituents are hydrided; treating the hydride material with hydrogen fluoride at a temperature in the range of from 60° C. to 250° C.; reacting the resulting reaction mixture with elemental fluoride at a temperature ranging up to about 700° C. whereby uranium values are converted to the hexafluorides; and recovering the uranium values in the form of the volatile hexafluoride. This process is particularly suitable for recovering uranium values from mixtures thereof with thorium and/or zirconium. The preferred alkali acid fluoride is potassium acid fluoride.

What is claimed is:

1. A process for recovering uranium values from metal compositions thereof with at least one metal selected from the group consisting of thorium and zirconium comprising hydriding said metal composition whereby the metal values are converted to hydrides; admixing the hydrided metal composition with a substantial amount of at least one alkali metal bifluoride; subjecting the resulting mixture to hydrogen fluoride at a temperature in the range of from 60° C. to 250° C. whereby the metal values are substantially converted to fluorides; subjecting the fluorinated metal values to gaseous fluorine at an elevated temperature up to about 700° C. whereby the uranium values are substantially converted to uranium hexafluoride; and separating the uranium hexafluoride from the reaction mixture.

2. A process in accordance with claim 1 wherein the alkali metal bifluoride is potassium acid fluoride.

References Cited in the file of this patent

UNITED STATES PATENTS

| | | |
|---|---|---|
| 2,534,677 | Newton et al. | Dec. 19, 1950 |
| 2,756,125 | Abelson | July 24, 1956 |
| 2,761,756 | Priest | Sept. 4, 1956 |
| 2,778,730 | Spedding | Jan. 22, 1957 |
| 2,785,046 | Butler | Mar. 12, 1957 |

FOREIGN PATENTS

| | | |
|---|---|---|
| 493,051 | Canada | May 19, 1953 |
| 511,412 | Canada | Mar. 29, 1955 |

OTHER REFERENCES

Katz et al.: Chemistry of Uranium NNES VIII–5 (1951), pp. 186–207 and 396–403, McGraw-Hill Book Co., Inc., New York. (Copy in Scientific Library.)